N. T. SPEER.
COTTON CHOPPER.
APPLICATION FILED APR. 24, 1909.

942,294.

Patented Dec. 7, 1909.
2 SHEETS—SHEET 1.

Witnesses

Inventor
Noah T. Speer.
By C. A. Snow & Co.
Attorneys

UNITED STATES PATENT OFFICE.

NOAH T. SPEER, OF NEW MADRID, MISSOURI, ASSIGNOR OF ONE-HALF TO MANDEL FRANKLE, OF NEW MADRID, MISSOURI.

COTTON-CHOPPER.

942,294. Specification of Letters Patent. Patented Dec. 7, 1909.

Application filed April 24, 1909. Serial No. 492,007.

To all whom it may concern:

Be it known that I, NOAH T. SPEER, a citizen of the United States, residing at New Madrid, in the county of New Madrid and State of Missouri, have invented a new and useful Cotton-Chopper, of which the following is a specification.

This invention has relation to cotton choppers, and it consists in the novel construction and arrangement of its parts, as hereinafter shown and described.

The object of the invention is to provide, in an implement of the character indicated, means whereby chopping hoes are carried in an orbital path transversely of the line of standing plants in such manner as to cleave out the superfluous plants and leave standing plants at intervals.

A further object of the invention is to provide structure for accomplishing the function stated in which the hoes are resiliently held against work when performing the chopping operation, and at the same time the elements upon which the hoes are supported are relieved of undue slack.

With these objects in view the cotton chopper includes a wheel-mounted frame having a shaft arranged to derive rotary movement from one of the supporting wheels of the frame, and which, through intermediate parts, is adapted to convey orbital movement to the supporting elements for the hoes. The structure also includes means for relieving the hoe-supporting elements from undue slack, which means also performs the function of resiliently holding the hoes in position during the chopping operation. In part, the hoe-supporting elements pass around guiding wheels which are journaled for rotation upon pivoted arms, and which are held at proper distances from the surface of the, ground by runners adjustably attached thereto, and which engage the surface of the soil as the implement progresses along the row of plants.

Figure 1:
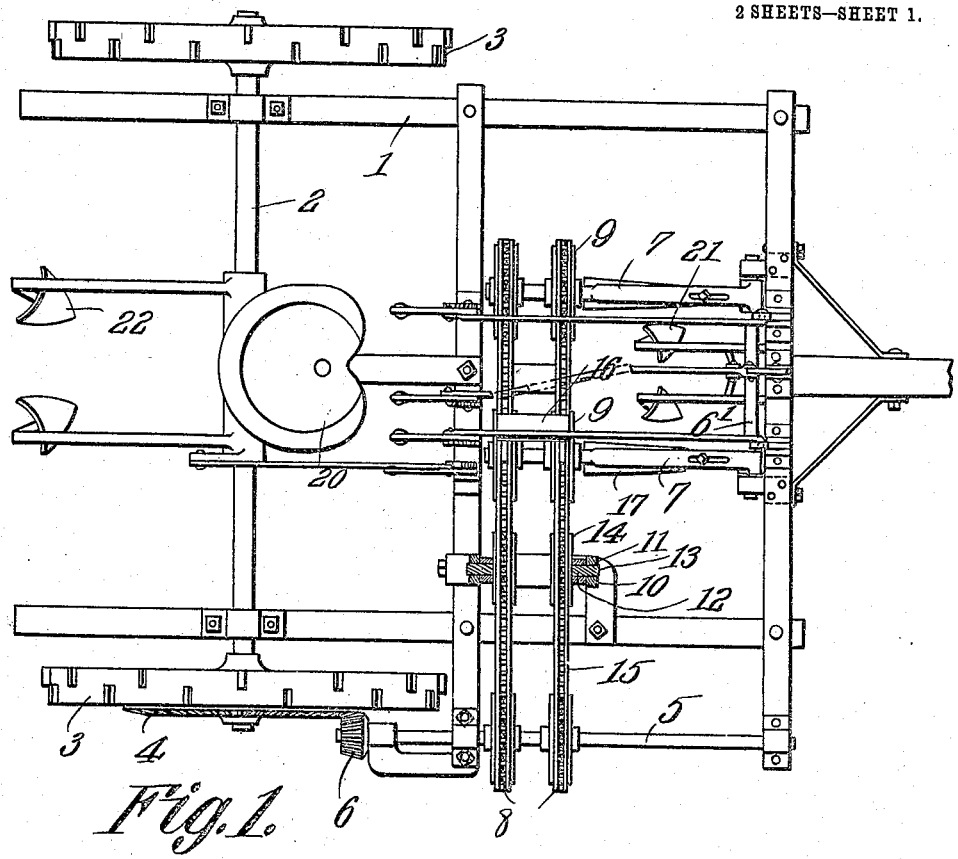
Figure 2:
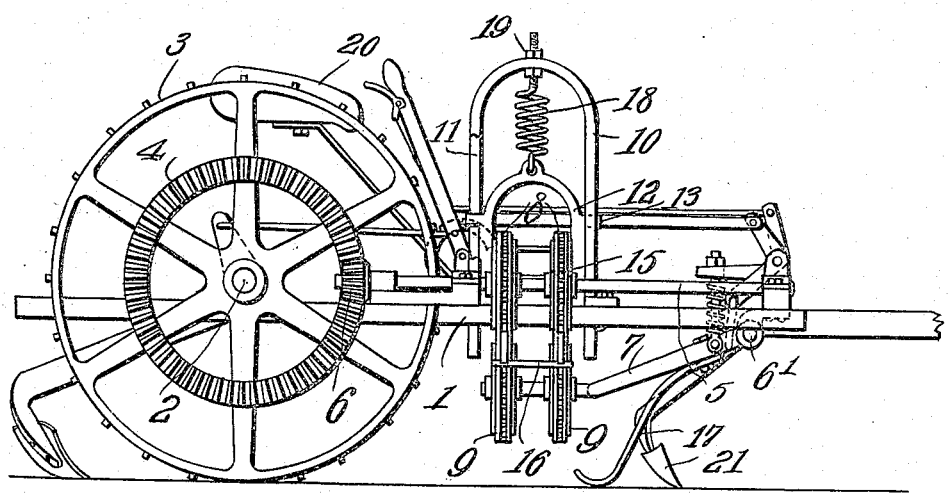
Figure 3:
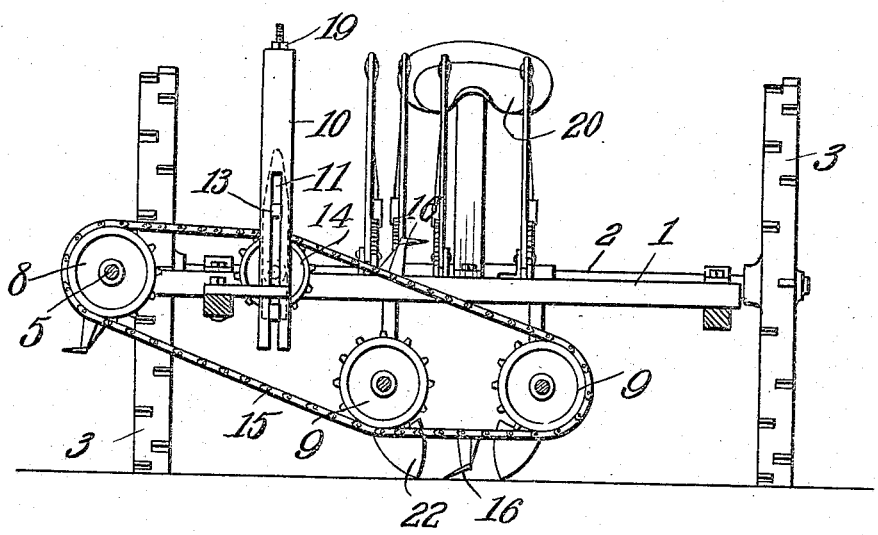

In the accompanying drawings:—Figure 1 is a top plan view of the cotton chopper, with parts in section. Fig. 2 is a side elevation of the same, with parts broken away. Fig. 3 is a front elevation of the cotton chopper, with parts in section and parts removed.

As illustrated in the accompanying drawings, the cotton chopper comprises a frame 1, which is mounted upon an axle 2, and which in turn is supported by traction wheels 3. Upon one of the traction wheels 3 is mounted concentrically a gear rim 4. A shaft 5 is journaled for rotation at one side of the frame 1 and is provided with a beveled pinion 6, which meshes with the gear rim 4. An arm 6' is pivotally attached to the frame 1, and extending rearwardly from the said arm are two spaced arms 7, 7. The arms 7 are free for vertical swinging movement. Sprocket wheels 8, 8 are fixed to the shaft 5, and sprocket wheels 9, 9, are journaled upon the rear end portions of the arms 7, 7. The sprocket wheels 8, 8 are spaced one from the other, as are also the respective sprocket wheels 9, 9, mounted upon the rear end portions of the arms 7, 7. A guide 10 is mounted upon the frame 1, and is provided in its sides with vertically disposed slots 11. A frame 12 is mounted for vertical movement in the guide 10, and is provided at each side with outwardly disposed lugs 13, which enter the slots 11 provided in the sides of the guide 10. Sprocket wheels 14 are journaled for rotation in the frame 12, and sprocket chains 15 pass around the sprocket wheels 8, 9, 9, and 14. Hoes 16 are mounted upon the sprocket chains 15, and inasmuch as the said chains are so disposed as to describe orbits transversely with relation to the frame 1, the hoes 16 carried by the chains are adapted to pass transversely across the line of plants along which the implement is passed. Runners 17 are adjustably attached to the arms 7, 7, and are adapted to bear at their lower, rear ends upon the surface of the soil. A spring 18 is attached at its lower end to the frame 12, and is adjustably connected by means of the jam nuts 19 with the upper portion of the guide 10. The spring 18 is under tension with a tendency to hold the frame 12 in an elevated position in the guide 10, although the weight of the said frame, and the sprocket chains and parts about which they pass, is sufficient to hold the hoes 16 in contact with the soil when they are passing transversely across the row of standing plants upon which the implement is designed to operate. An operator's seat 20 is mounted upon the frame 1. Plows or disks 21, are attached to the forward portion of the frame 1, and are adapted to cast soil away from the sides of the row of standing plants.

Plows or disks 22, are attached to the axle 2, and are so disposed as to cast soil toward the sides of the row of plants left standing.

The operation of the cotton chopper is as follows:—As the implement is drawn along the row of standing plants it is so moved that the said row passes between the plows or disks 21, and, in so doing, the earth at the opposite sides of the row of standing plants is cast away from the row. By reason of the fact that the wheels 3 have frictional contact with the surface of the ground, the axle 2 is rotated, and, inasmuch as one of the said wheels 3 is provided with a gear rim (indicated as 4) rotary movement is transmitted from the traction wheel bearing the said gear rim to the shaft 5. By reason of such movement orbital movement is transmitted to the chains 15, and a similar movement is imparted to the hoes 16. As the said hoes pass under the sprocket wheels 9, 9, and from one set of sprocket wheels 9 toward the other, they move approximately in a horizontal direction, although the arms 7 are at liberty to move vertically at their rear ends upon the axis of the arm 6'. As the said hoes 16 move from one set of sprocket wheels 9 toward the other set they chop out superfluous plants in the row of standing plants and during the intervals in the course of movement of the chains 15 between one hoe 16 and its predecessor sufficient time elapses to escape a few plants left standing in the row. These plants which escape the action of the hoes constitute the stand of plants permitted to remain in the row. Against those plants left standing in the row the soil is lifted by the plows or disk 22, and, thus the roots of the standing plants are protected by a layer of soil cast up by the said plows or disk 22.

During the chopping operation of the hoes 16, as hereinbefore indicated, should the implement pass over elevations or depressions in the soil the said elevations or depressions will be followed by the runners 17, and the arms 7 will rise or fall to accommodate themselves to the contour of the surface of the soil, and, consequently, the hoes 16 will cut at a uniform depth below the surface of the soil, irrespective of the contour of the same. To compensate for this vertical movement on the part of the arms 7 the tension of the coil spring 18 comes into play and moves the frame 12 vertically in the guide 10, and thus the chains 15 are maintained at uniform tension and devoid of undue slack.

The cotton chopper is provided with ordinary lever mechanisms as shown for raising and lowering the arms 7 and the plows 21 and 22. The lever mechanism for raising and lowering the arms 7 has resilient connection with the said arms, and thus the said arms are resiliently held in lowered position. The said connections are shown in Fig. 2 of the drawings and are such as are generally employed for resiliently holding the pivoted arms in lowered position in agricultural implements.

Having described my invention, what I claim as new, and desire to secure, by Letters Patent, is:—

1. A cotton chopper comprising hoe-supporting elements mounted for orbital movement, hoes carried by said elements, pivoted arms for holding the elements and hoes carried thereby in position for performing the chopping operation, means for moving the elements, and resilient means for uniformly maintaining the hoe-supporting elements during their orbital movement.

2. A cotton chopper comprising hoe-supporting elements mounted for orbital movement, chopping hoes supported by said elements, means for moving said elements, arms pivotally mounted and having wheels adapted to guide the hoe-supporting elements during the chopping operation of the hoes, and resilient means for maintaining the hoe-supporting elements during the chopping operation.

3. A cotton chopper comprising hoe-supporting elements mounted for orbital movement, hoes supported by said elements, means for moving the said elements, arms pivotally mounted and carrying wheels for guiding the hoe-supporting elements, runners adjustably attached to the arms and adapted to travel upon the surface of the soil, and resilient means for maintaining the hoe-supporting elements in position during the chopping operation of the hoes.

In testimony that I claim the foregoing as my own, I have hereto affixed my signature in the presence of two witnesses.

NOAH T. SPEER.

Witnesses:
DAVID KNOTT,
WELTON O'BANNON.